(12) United States Patent
Barbosa et al.

(10) Patent No.: US 11,333,229 B2
(45) Date of Patent: May 17, 2022

(54) ROLLER SCREW SYSTEM

(71) Applicant: ZF ACTIVE SAFETY US INC., Livonia, MI (US)

(72) Inventors: Manuel Barbosa, Novi, MI (US); Kraig Eric Gerber, Plymouth, MI (US); Anthony Lawrence Delricci, Plymouth, MI (US); Galus Chelaidite, South Lyon, MI (US)

(73) Assignee: ZF Active Safety US Inc., Livonia, MI (US)

( * ) Notice: Subject to any disclaimer, the term of this patent is extended or adjusted under 35 U.S.C. 154(b) by 200 days.

(21) Appl. No.: 16/821,158

(22) Filed: Mar. 17, 2020

(65) Prior Publication Data
US 2021/0293313 A1   Sep. 23, 2021

(51) Int. Cl.
*F16D 55/16* (2006.01)
*F16H 25/22* (2006.01)
(Continued)

(52) U.S. Cl.
CPC ....... *F16H 25/2252* (2013.01); *F16D 55/226* (2013.01); *F16D 2121/24* (2013.01); *F16D 2125/40* (2013.01); *F16H 2025/2271* (2013.01)

(58) Field of Classification Search
CPC .............. F16D 55/226; F16D 2121/24; F16D 2125/36; F16D 2125/40; B60T 13/741;
(Continued)

(56) References Cited

U.S. PATENT DOCUMENTS 4,050,319 A * 9/1977 Stanley ............... F16H 25/2266
74/424.92
6,158,557 A * 12/2000 Leitermann ............. F16D 65/14
188/162
(Continued)

FOREIGN PATENT DOCUMENTS

DE   112014004577 T5   7/2016

OTHER PUBLICATIONS

Norm DIN 103-1 1977-04-00.Metrisches ISO-Trapezgewinde; Gewindeprofile. S. 1-5 URL: http://perinorm/Perinorm-Volltexte/Grundbestand/CD21D E_01/1069085/1069085.pdf?. ISO Metric Trapezoidal Screw Thread.
(Continued)

*Primary Examiner* — Nicholas J Lane
(74) *Attorney, Agent, or Firm* — Robert James Harwood

(57) ABSTRACT

A roller screw system includes a spindle defining a longitudinal axis about which the spindle rotates. A nut at least partially radially surrounds the spindle. The nut is configured for longitudinal motion with respect to the spindle. At least one non-helically grooved roller is interposed radially between the spindle and the nut. A cage maintains the at least one roller in position radially between the spindle and the nut and supports the at least one roller for rotational motion. The nut is moved in longitudinally in a duty cycle responsive to transmission of rotational motion from the spindle to the at least one roller, and transformation of rotational motion of the at least one roller to longitudinal motion of the nut. A home position of the nut and a home position of the cage both move longitudinally after a predetermined number of duty cycles.

17 Claims, 12 Drawing Sheets

(51) Int. Cl.
     *F16D 55/226*      (2006.01)
     *F16D 125/40*      (2012.01)
     *F16D 121/24*      (2012.01)

(58) Field of Classification Search
     CPC ............ F16H 25/2266; F16H 25/2252; F16H 2025/2271; F16H 2025/2276; F16H 2025/228
     See application file for complete search history.

(56) References Cited

U.S. PATENT DOCUMENTS

| | | | | |
|---|---|---|---|---|
| 6,325,180 | B1* | 12/2001 | De Vries | H02K 7/06 188/72.1 |
| 6,367,597 | B1* | 4/2002 | De Vries | B60T 13/741 188/196 V |
| 10,337,575 | B2* | 7/2019 | Lee | F16D 65/66 |
| 2012/0204665 | A1* | 8/2012 | Baudasse | F16H 25/2252 74/424.92 |
| 2012/0292140 | A1* | 11/2012 | Reich | F16D 65/56 188/72.3 |
| 2014/0245848 | A1* | 9/2014 | Ikeda | F16H 25/2204 74/89.44 |
| 2017/0219070 | A1* | 8/2017 | Pasquet | F16D 65/18 |
| 2020/0041010 | A1* | 2/2020 | Chen | F16K 5/201 |

OTHER PUBLICATIONS

Roymech: Torque efficiency equations for power screws. S. 1-6. URL: https://roymech.org/Useful_Tab les/Cams_Springs/Power_Sere ws_1.html [abgerufen am Apr. 27, 2021].

\* cited by examiner

ROLLER SCREW SYSTEM

TECHNICAL FIELD

This disclosure relates to a roller screw and, more particularly, to a roller screw system which can be used with an electromechanical brake apparatus.

BACKGROUND

Vehicle brake systems typically have a service brake that has service brake apply modes and a parking brake system that has parking brake apply modes. During a service brake apply, hydraulic pressure is applied to move the piston. In recent systems, during a parking brake apply, an electric motor and drive mechanism moves the piston to create the parking brake apply by pressing a brake pad against a rotor on the wheel. Once the parking brake apply is complete the motor is turned off. Typically, a worm gear or some other threaded member (e.g., lead screw) is located between the piston and the motor, which prevents the piston from back driving the mechanism and motor.

SUMMARY

In an aspect, a roller screw system is described. A spindle includes a helically threaded portion and defines a longitudinal axis about which the spindle rotates. A nut at least partially radially surrounds the helically threaded portion of the spindle. The nut includes a helical thread on an interior lumen wall thereof. The nut is configured for longitudinal motion selectively in a first direction and in a second direction, opposite the first direction, with respect to the spindle. At least one non-helically grooved roller is interposed radially between the spindle and the nut. A cage maintains the at least one roller in position radially between the spindle and the nut. The cage supports the at least one roller for rotational motion about a longitudinal axis of the at least one roller. The at least one roller maintains a substantially constant longitudinal position with respect to the cage during operation of the roller screw system. The nut is moved in the first and second directions in a duty cycle responsive to transmission of rotational motion from the spindle to the at least one roller, and transformation of rotational motion of the at least one roller to longitudinal motion of the nut. A home position of the nut with respect to the spindle and a home position of the cage with respect to the nut both move longitudinally after a predetermined number of duty cycles.

In an aspect, an electromechanical brake apparatus is described. A housing defines a mechanism cavity. A roller screw is located at least partially within the mechanism cavity. The roller screw includes a spindle including a helically threaded portion and defining a longitudinal axis about which the spindle rotates. A nut at least partially radially surrounds the helically threaded portion of the spindle. The nut includes a helical thread on an interior lumen wall thereof. The nut is configured for longitudinal motion selectively in a first direction and in a second direction, opposite the first direction, with respect to the spindle. At least one non-helically grooved roller is interposed radially between the spindle and the nut. A cage maintains the at least one roller in position radially between the spindle and the nut. The cage supports the at least one roller for rotational motion about a longitudinal axis of the at least one roller. The at least one roller maintains a substantially constant longitudinal position with respect to the cage during operation of the roller screw system. A brake pad is operatively connected to the nut for longitudinal driving thereby. The nut is moved, and responsively moves the brake pad, in the first and second directions in a duty cycle responsive to transmission of rotational motion from the spindle to the at least one roller and transformation of rotational motion of the at least one roller to longitudinal motion of the nut. A motor is operatively connected to the spindle to provide rotational motion thereto.

BRIEF DESCRIPTION OF THE DRAWINGS

For a better understanding, reference may be made to the accompanying drawings, in which.

Figure 1:
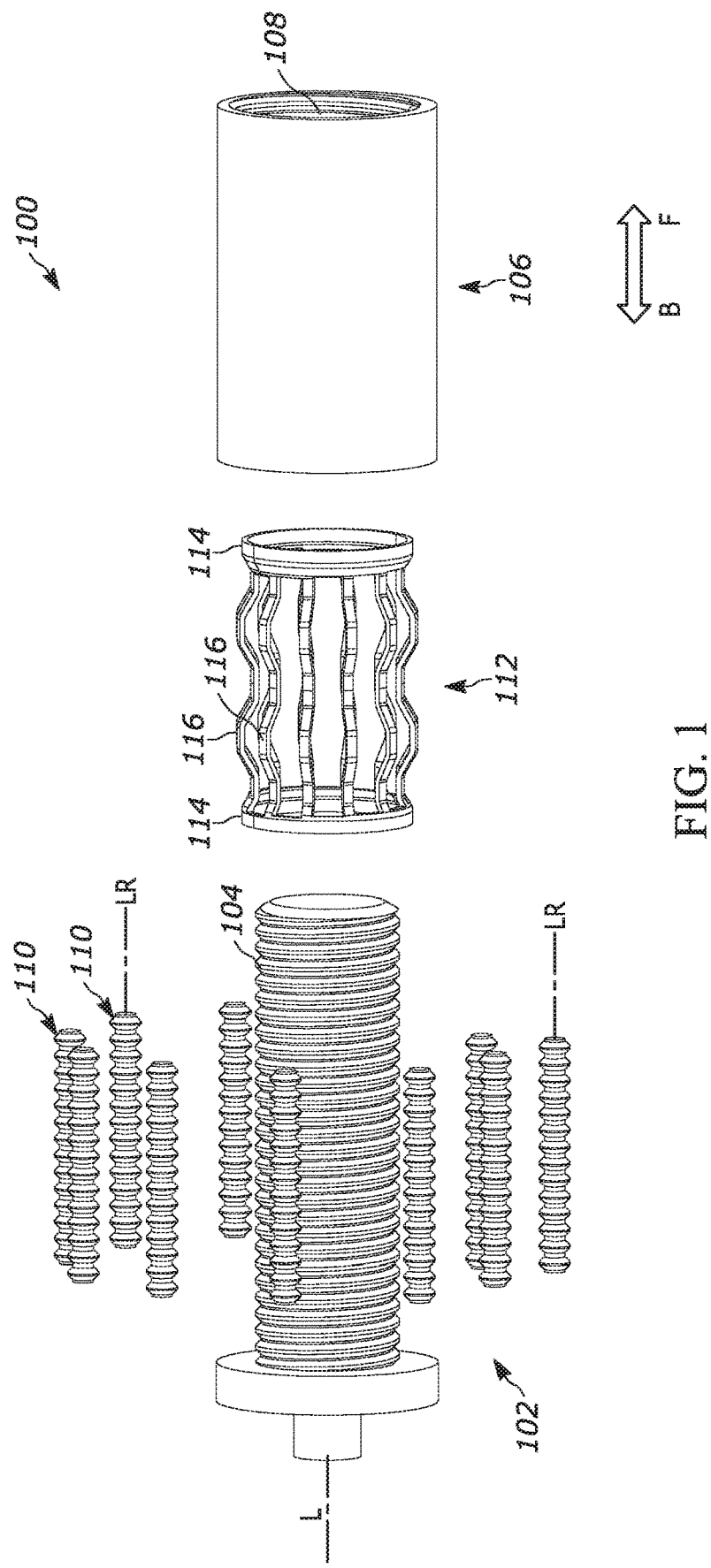
FIG. 1 is an exploded perspective side view of a roller screw system.
Figure 2:
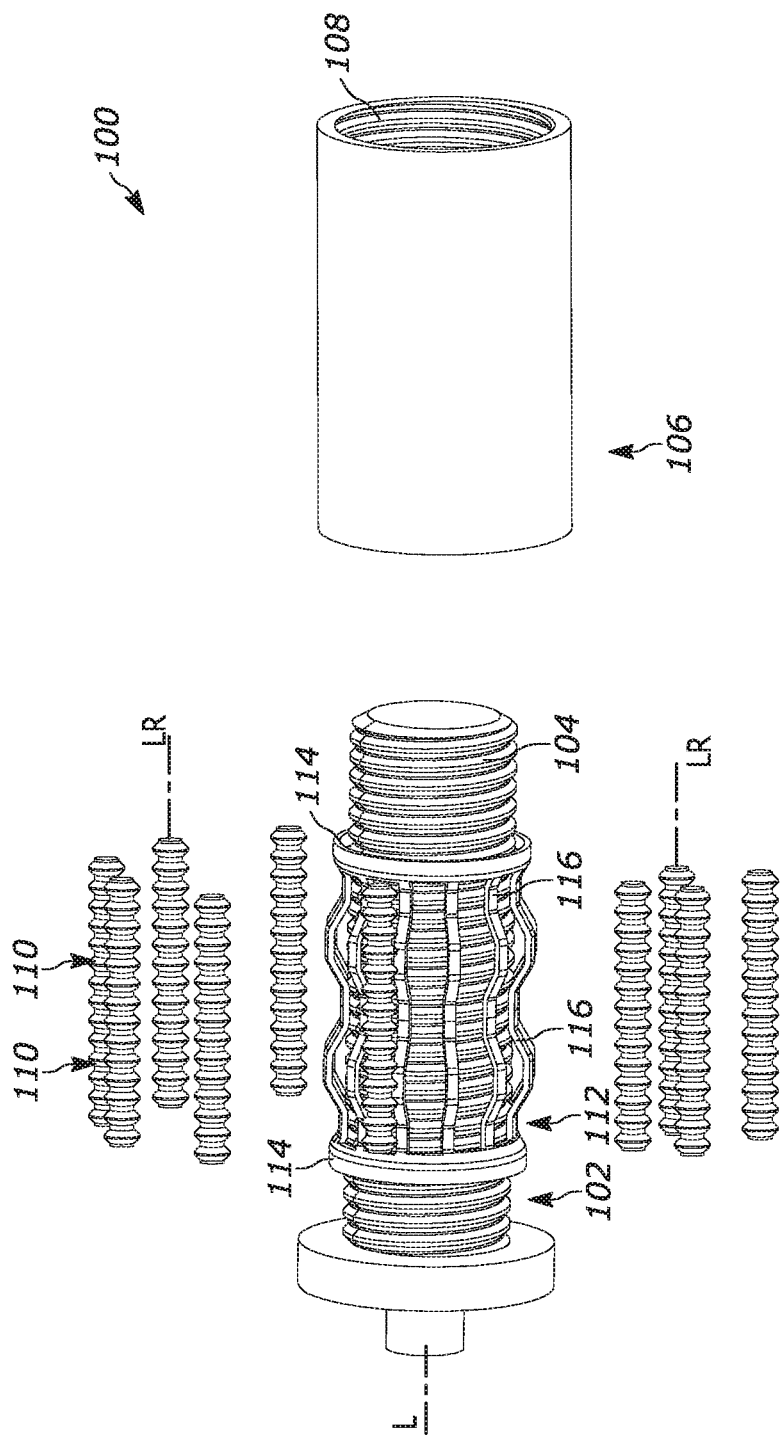
FIGS. 2-4 schematically depict a sequence of assembly of the roller screw system of FIG. 1.

This application includes an appendix that forms an integral part of this application. Appendix A provides an example implementation.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

As used herein, the singular forms "a," "an", and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on," "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

FIG. 1 depicts a roller screw system 100 including a spindle 102 having a helically threaded portion 104 and defining a longitudinal axis L about which the spindle 102 rotates. The term "longitudinal" is used herein to reference a direction axially coincident with the spindle 102, and is substantially in the horizontal direction, in the orientation of FIG. 1.

A nut 106 at least partially radially surrounds the helically threaded portion 104 of the spindle 102. The nut 106 includes a helical thread on an interior lumen wall 108 thereof. The nut 106 is configured for longitudinal motion selectively in a first direction and in a second direction, opposite the first direction, with respect to the spindle 102. For example, the nut 106 could travel in the forward F and backward B directions, as shown in FIG. 1.

Figure 3:
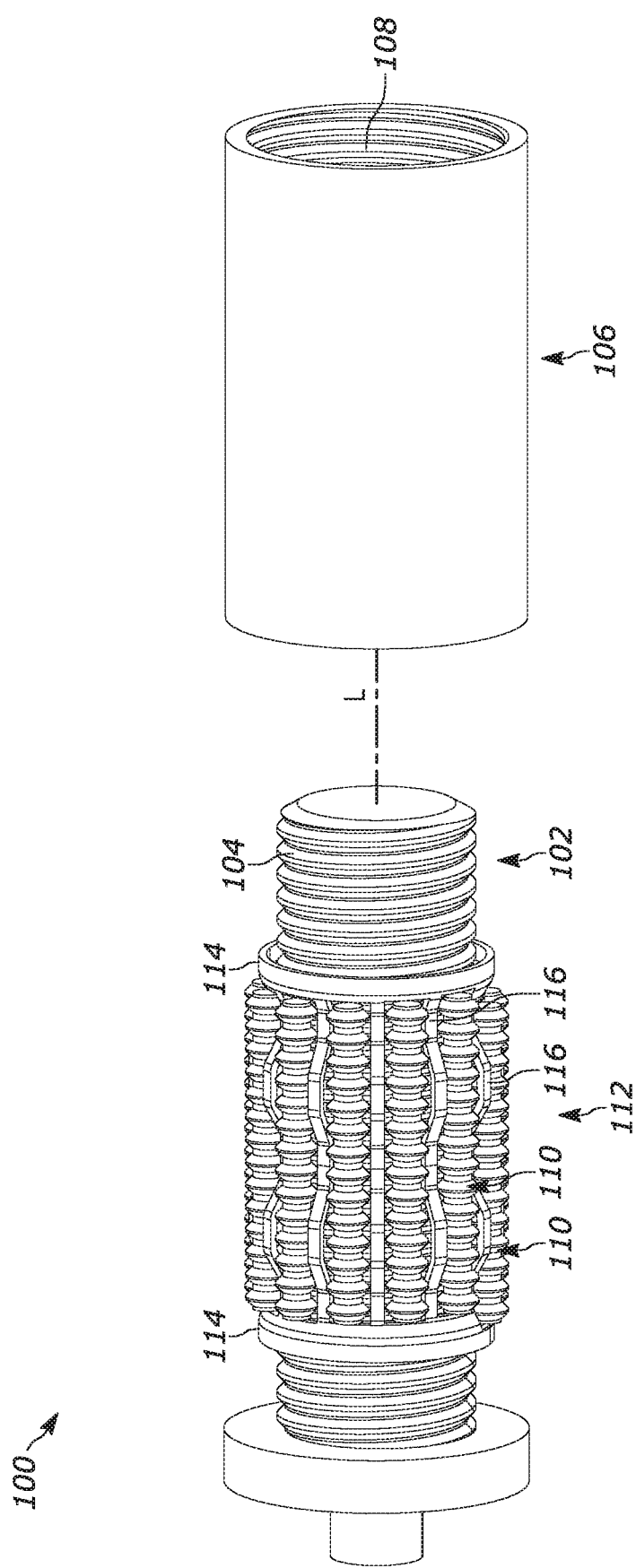
Figure 4:
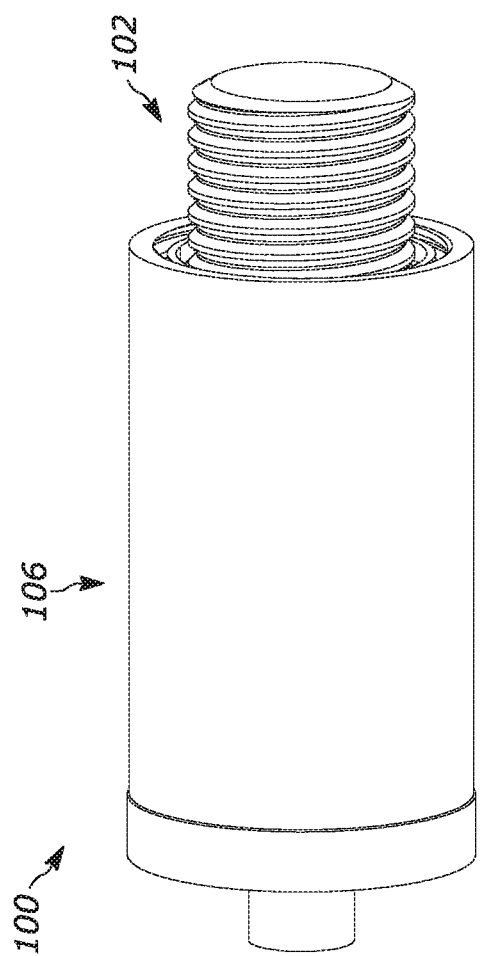

At least one non-helically grooved roller 110 is interposed radially between the spindle 102 and the nut 106. A cage 112 maintains the at least one roller 110 in position radially between the spindle 102 and the nut 106, as shown in FIG. 3. The "radial" direction, as referenced herein, is a direction which is substantially perpendicular to the longitudinal direction, and extends into and out of the plane of the page, in FIGS. 1-4.

The cage 112 supports the at least one roller 110 for rotational motion about a longitudinal axis LR, as shown in the Figures, of the at least one roller 110. The at least one roller 110 maintains a substantially constant longitudinal position with respect to the cage 112 during operation of the roller screw system 100. Stated differently, the roller screw system 100 shown and described herein is not of the recirculating type; instead, the cage 112 holds the rollers 110 in the position shown in at least FIG. 3 during operation of the roller screw system 100. The rollers 110 do not shift longitudinal position with respect to the cage 112 from that shown in FIG. 3 during operation of the roller screw system 100.

The rollers 110, as with the other components of the roller screw system 100, could have any desired specifications for a particular use environment. Several example configurations of various components of the roller screw system 100 are given in Appendix A, which is incorporated herein by reference as an integral part of this application. For example, the at least one roller 110 may have a thread angle in the range of 0° to 90°, more specifically, 10° to 60°, and even more specifically, 15° to 45°. The term "thread angle" is used herein to reference an angle between a reference plane taken substantially perpendicular to the longitudinal axis of a threaded rod (e.g., LR of roller 110) and the flank of the thread. The "thread angle" is the angle labeled θ in the Power Screw reference available at https://roymech.org/Useful_Tables/Cams_Springs/Power_Screws_1.html (last visited 16 Mar. 2020). It should be noted, though, that the at least one roller 110 is non-helically threaded. That is, a series of closed grooves are provided along the length of the roller 110, rather than a continuous "advancing" screw-type thread as in a "helically" threaded component.

It is contemplated that the roller screw system 100 could include a number of rollers in the range of three to twenty, and more specifically, for some use environments, ten rollers 110 will be provided.

It is contemplated that the cage 112 could include one or more axles (not shown), fully or partially extending into a corresponding bore of one or more rollers 110, to facilitate both maintenance of the rollers 110 in position with respect to the cage 112 and rotation of the rollers 110 about their own longitudinal axes LR.

As shown in at least FIGS. 1-4, the cage 112 may include longitudinally spaced first and second rings 114 and a plurality of longitudinally extending bars 116. When present, the cage 112 may be configured to maintain the at least one roller 110 longitudinally between the first and second rings 114, and/or between a pair of adjacent bars 116 about a circumference of the roller 112.

Figure 5:
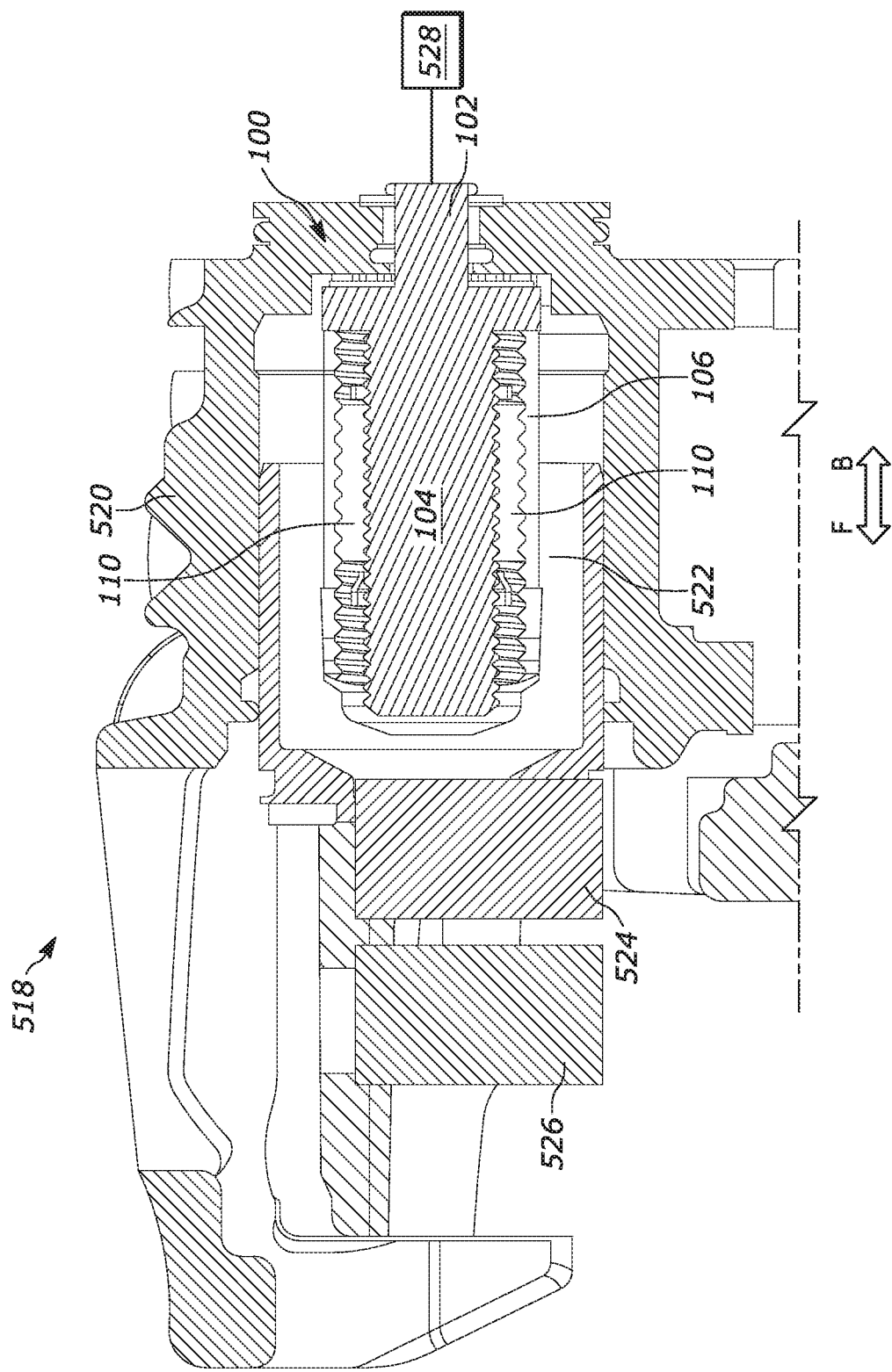
FIG. 5 is a partial side view of an electromechanical brake apparatus including the roller screw system of FIG. 1.

FIG. 5 depicts, as an example use environment for a roller screw system 100, an electromechanical brake apparatus 518. The electromechanical brake apparatus 518 includes a housing 520 defining a mechanism cavity 522. The roller screw system 100 is located at least partially within the mechanism cavity 522. A brake pad 524 is operatively connected to the nut 106, either directly or through one or more intervening structures, for longitudinal driving thereby. The nut 106 is moved, and responsively moves the brake pad 524, in the first and second directions (as shown in FIG. 5, forward F and backward B) to selectively place the brake pad 524 in frictional contact with a rotor 526 during parking and/or service brake usage of the electromechanical brake apparatus 518. Motion of the nut 106 (and, by extension, the brake pad 524) occurs along a duty cycle responsive to transmission of rotational motion from the spindle 102 to the at least one roller 110, and subsequent transformation of rotational motion of the at least one roller 110 to longitudinal motion of the nut 106. A motor (shown schematically at 528 in FIG. 5) is operatively connected to the spindle 102 to provide rotational motion thereto. The motor 528 could be, for example, the brushless or brushed direct current type. It is contemplated that a gearing unit (not shown) could be provided mechanically between the motor 528 and the spindle 102 in certain use applications. It is also contemplated that the roller screw system 100 could be at least partially surrounded by a screw housing, as desired, within the housing 522 protect the roller screw system 100, for ease of installation and/or operation, or for any other purpose.

A "duty cycle" is defined herein as the cycle of operation of a machine which operates intermittently rather than continuously. Here, the roller screw system 100 operates intermittently as a portion of the electromechanical brake apparatus 518. The roller screw system 100 is driven, for example, by the motor 528 in a first rotary direction (e.g., counterclockwise) to result in motion of the spindle 102 in the first, or forward, direction to push the brake pad 524 longitudinally toward the rotor 526 via the connection of the nut 106 with the brake pad 524. The roller screw system 100 could then be driven, for example, by the motor 528 in a second rotary direction (e.g., clockwise) to result in motion of the spindle 102 in the second, or backward, direction to pull the brake pad 524 longitudinally away from the rotor 526, again via connection of the nut 106 with the brake pad 524.

That is, the nut 106 may be moved in the first and second (forward F and backward B, respectively, as shown in the Figures) directions in a duty cycle responsive to transmission of rotational motion from the spindle 102 (rotating around the longitudinal axis L) to the at least one roller 110, and transformation of rotational motion of the at least one roller 110 about its own longitudinal axis LR to longitudinal motion of the nut 106. As shown schematically in FIGS. 6A-6B, a home position of the nut 106 with respect to the spindle 102 and a home position of the cage 112 with respect to the nut 106 both move longitudinally after a predetermined number of duty cycles. The brake pad 524 could be attached directly to the nut 106 or an intermediate structure of any suitable type could be provided to transmit longitudinal motion from the nut 106 to the brake pad 524.

Figure 6A:
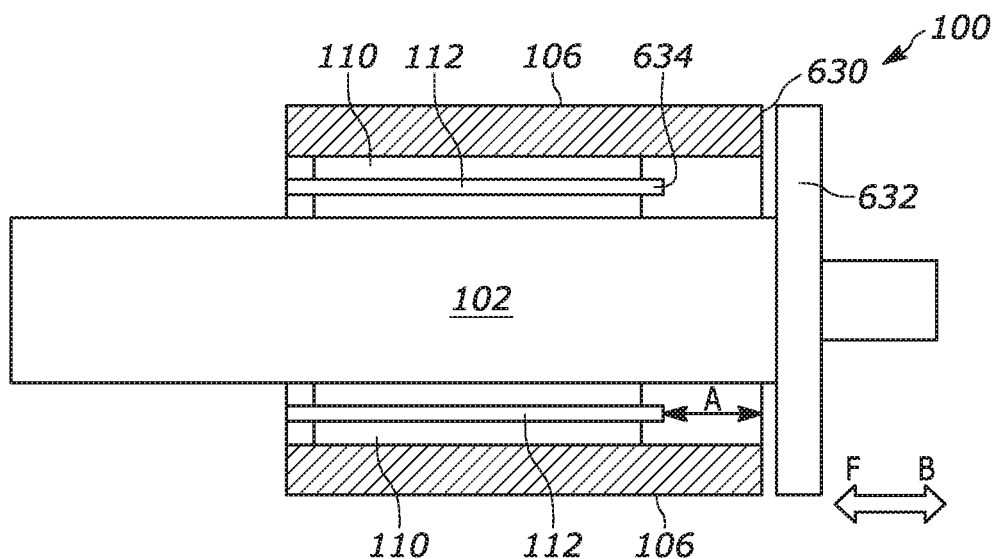
FIG. 6A schematically depicts the roller screw system of FIG. 1 in a first use configuration.

FIG. 6A depicts a "home" configuration of the roller screw system 100 at a first stage in the life of the roller screw system 100. This first stage may be, for example, soon after manufacture of the roller screw system 100. When the roller screw system 100 is used in an electromechanical brake apparatus 518, it may be in the home configuration of the first stage when a brake pad 524 is fairly new, and is at its thickest. In this first stage home configuration, a first end 630 of the nut 106 may be immediately and closely adjacent to a flange 632 of the spindle 102, and a first end 634 of the cage 112 may be spaced somewhat apart from the first end 630 of the nut 106. It should be noted that the distances and spacing could be quite small and need not result in alignment of various components longitudinally with respect to each other; it is emphasized that FIGS. 6A-6B merely schematically depict trends of motion, and, like all Figures of the present application, are not drawn to scale. The nut 106 and cage 112 (with associated rollers 110) will reciprocate longitudinally during operation of the roller screw system 100, but the "home" configuration or position is intended to be a "resting state" position to which the roller screw system 100 returns when not energized for use.

Figure 6B:
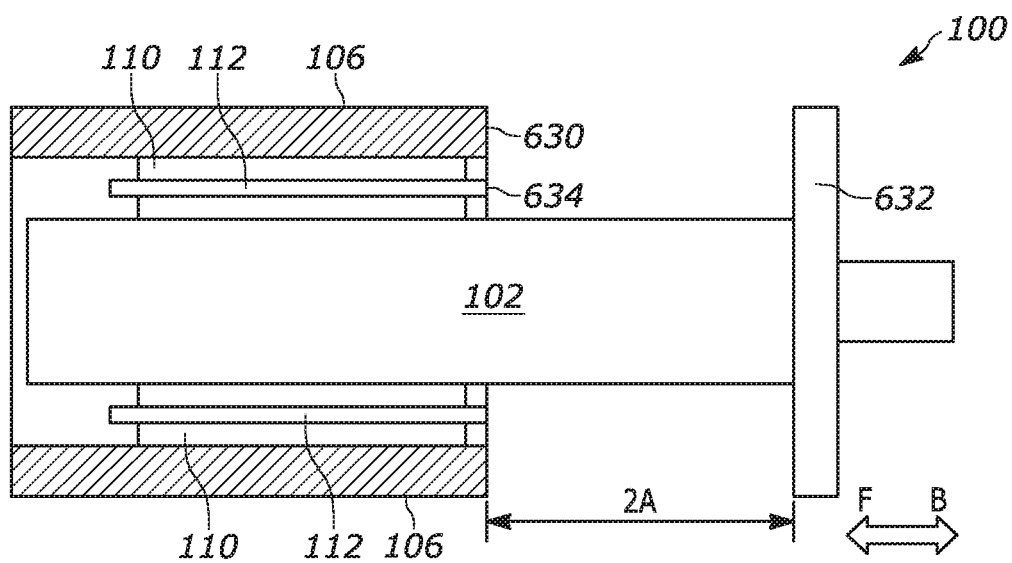
FIG. 6B schematically depicts the roller screw system of FIG. 1 in a second use configuration.

At least in part because the roller screw system 100 is not of the recirculating type, the rollers 110 will tend to "climb" or shift with respect to the nut 106 and/or the spindle 102 during operation due to the natural interactions of the threads (helical and non-helical) of these components, even while moving reciprocally in the first and second directions during the duty cycles of the roller screw system 100. FIG. 6B schematically depicts a "home" configuration of the roller screw system 100 at a second stage in the life of the roller screw system 100. The second stage may be, for example, after a predetermined number of duty cycles have passed, and may correlate to wearing away and subsequent thinning of the brake pad 524 during use.

As can be seen in FIG. 6B, the home position of the nut 106 with respect to the spindle 102 has moved longitudinally in the first direction after the predetermined number of duty cycles. Concurrently, the home position of the cage 112 with respect to the nut 106 has moved longitudinally in the second direction after the predetermined number of duty cycles. Again, this phenomenon tends to occur when the rollers 110 gradually shift with respect to the nut 106 and the spindle 102 over at least a predetermined number of duty cycles. For most use environments, this predetermined number will be quite large, potentially in the tens of thousands.

It is noted that, in an electromechanical brake apparatus 518 use environment, this longitudinal shifting may be designed by one of ordinary skill in the art to correlate quite conveniently to wear on the brake pads 524, such that the roller screw system 100 can be "reset" to the home position or configuration of the first stage at the time that the brake pads 524 are replaced. This is the use environment shown as an example, and schematically, in FIGS. 6A-6B. For example, the first end 634 of the cage 112 could initially be located in the first stage a distance "A" (which could be, for some use configurations, about 15 mm) from the first end 630 of the nut 106. Then, in the second stage, the first end 630 of the nut 106 might be located distance 2A from the flanged 632 of the spindle 102, which would translate to about 30 mm, in the mechanical arrangement depicted in FIGS. 6A-6B. Throughout such "traveling" of the nut 106 and/or the cage 112 with respect to the spindle 102, the rollers 110 remain in their original longitudinal position with respect to the cage 112 and move there with as a single unit.

Figure 7:
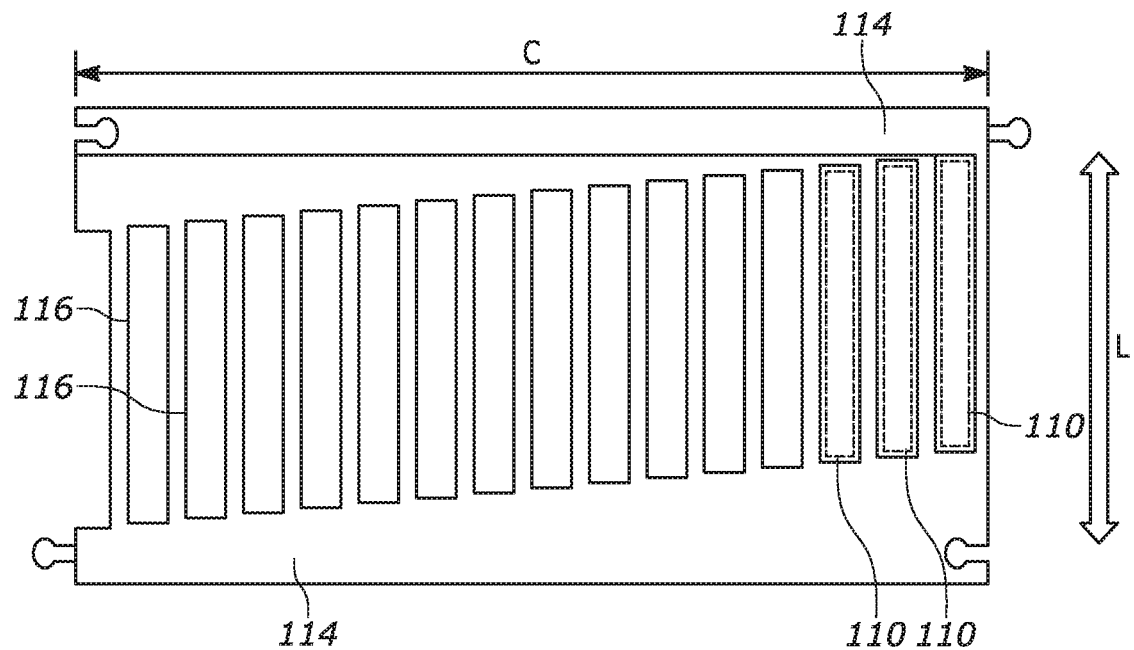
FIG. 7 is a disassembled view of a component of the roller screw system of FIG. 1.

As alluded to previously, the roller screw system 100 could include a plurality of rollers 110, with at least two of the plurality of rollers 110 being maintained at different longitudinal positions with respect to the cage 112. FIG. 7 schematically depicts a flattened-out "blank" that can be formed into a cage 112 during manufacture of the roller screw system 100. As is apparent from FIG. 7, the bars 116, which extend longitudinally, are interposed in circumferential direction C between adjacent rollers 110 however, and also as visible in FIG. 7, the rings 114 may be "stepped" or "tapered" in order to maintain rollers 110 at different longitudinal positions with respect to the cage 112 during operation of the roller screw system 100. It is contemplated that the distance by which the longitudinal positions of one or more rollers 110 are offset from one another may be determined taking into account, for example, the thread angles or other thread/groove properties of one or more components of the roller screw system 100.

Figure 8:
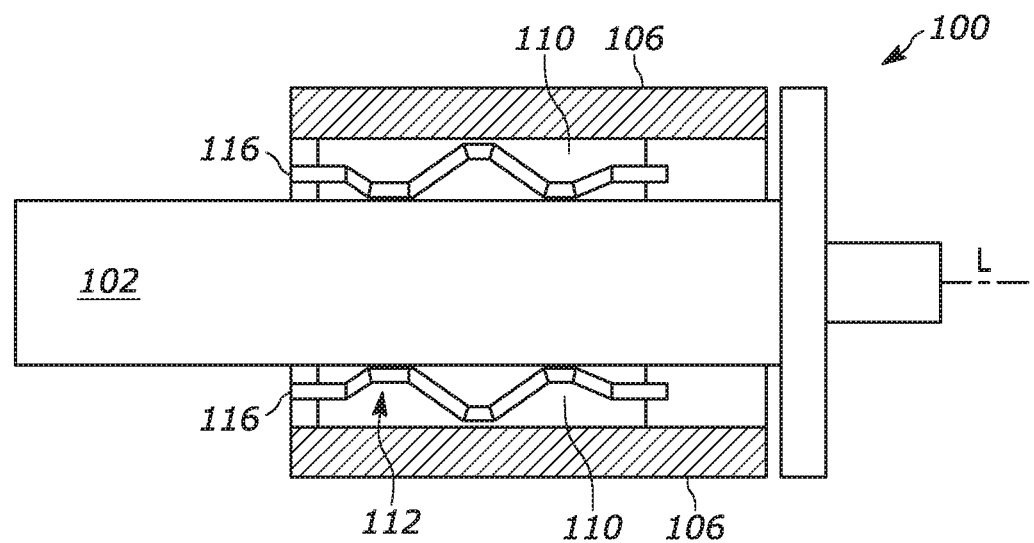
FIG. 8 is a schematic partial side view of the roller screw system of FIG. 1 in a first example configuration.
Figure 9A:
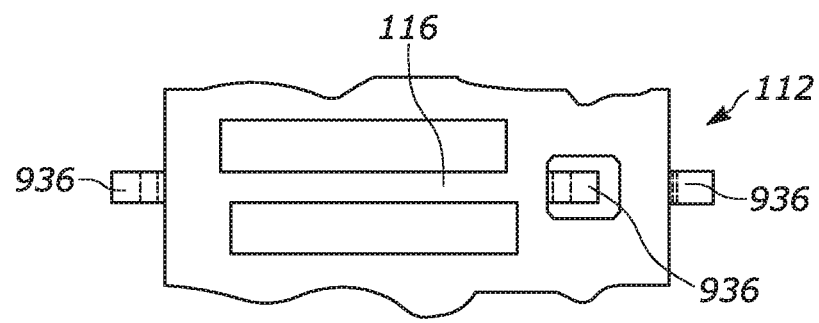
FIG. 9A is a partial side view of a component of the roller screw system of FIG. 1.
Figure 9B:
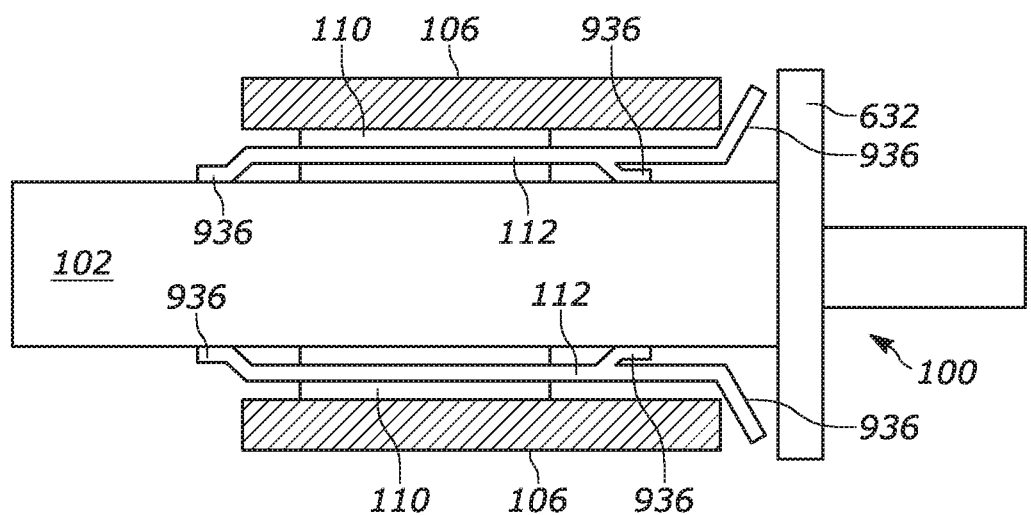
FIG. 9B is a schematic partial side view of the component of FIG. 9A in an example use configuration in the roller screw system of FIG. 1.
Figure 10A:
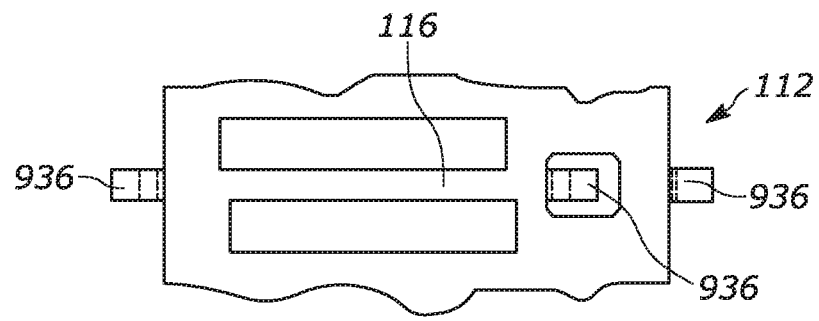
FIG. 10A is a partial side view of a component of the roller screw system of FIG. 1.
Figure 10B:
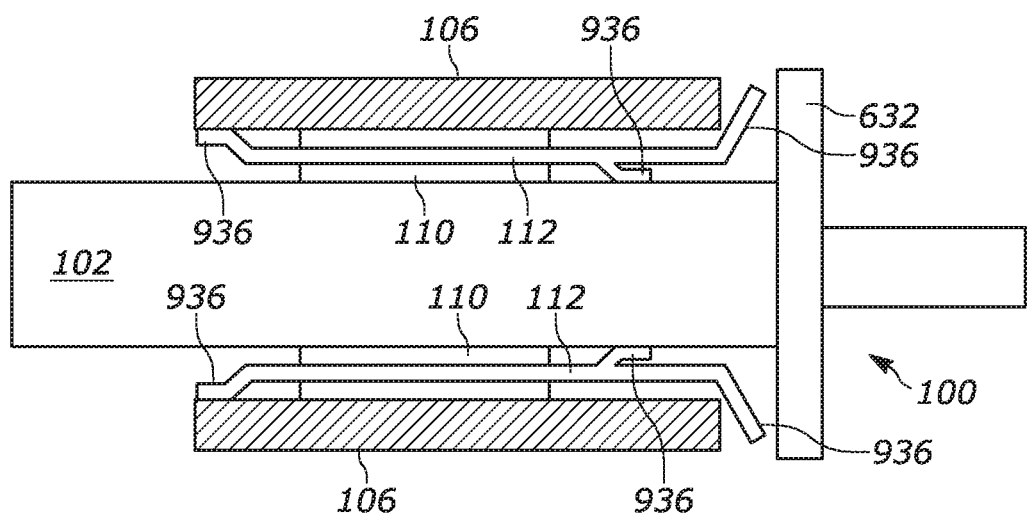
FIG. 10B is a schematic partial side view of the component of FIG. 10A in an example use configuration in the roller screw system of FIG. 1.
Figure 11A:
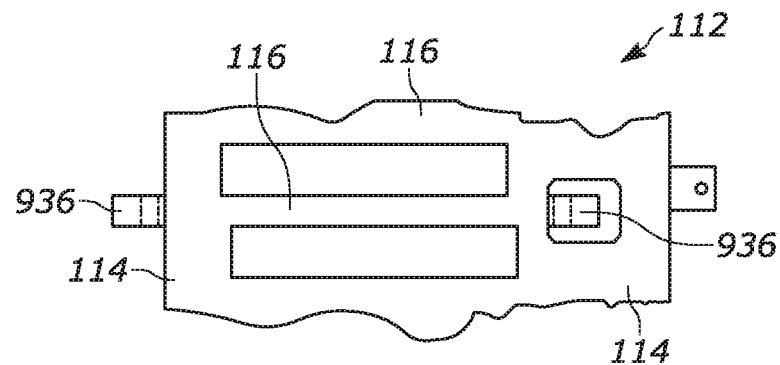
FIG. 11A is a partial side view of a component of the roller screw system of FIG. 1.
Figure 11B:
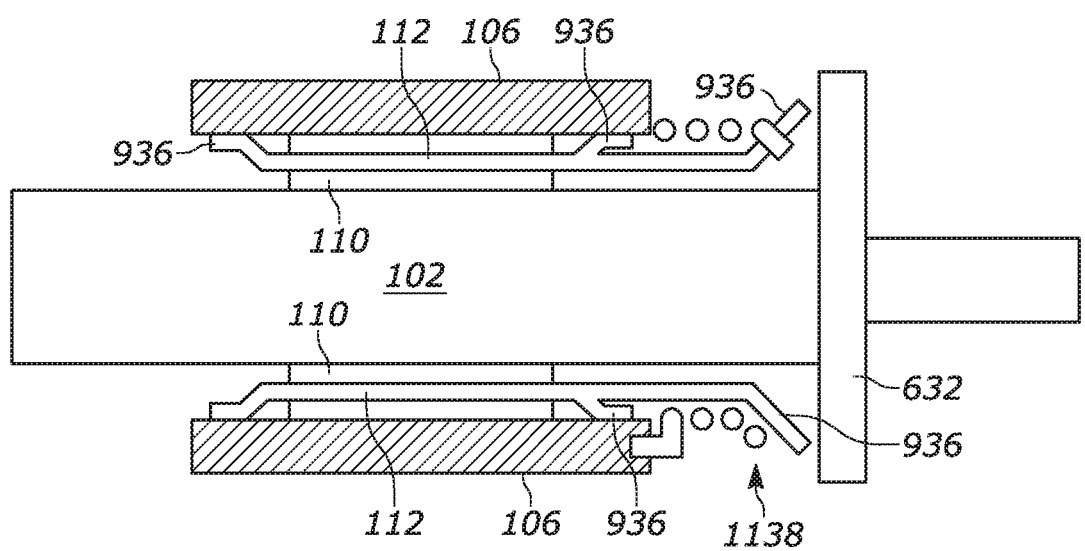
FIG. 11B is a schematic partial side view of the component of FIG. 11A in an example use configuration in the roller screw system of FIG. 1.
Figure 12A:
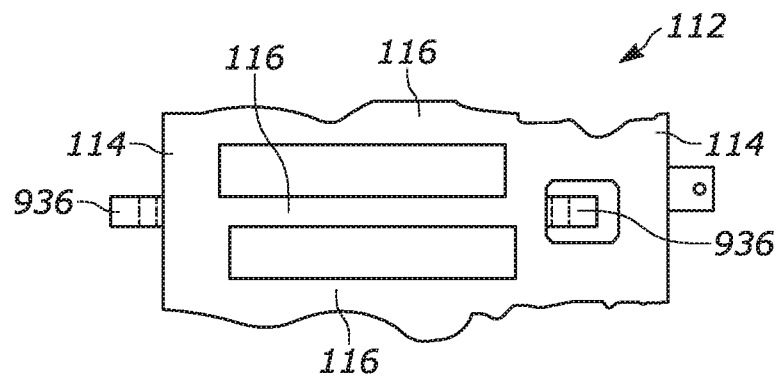
FIG. 12A is a partial side view of a component of the roller screw system of FIG. 1.
Figure 12B:
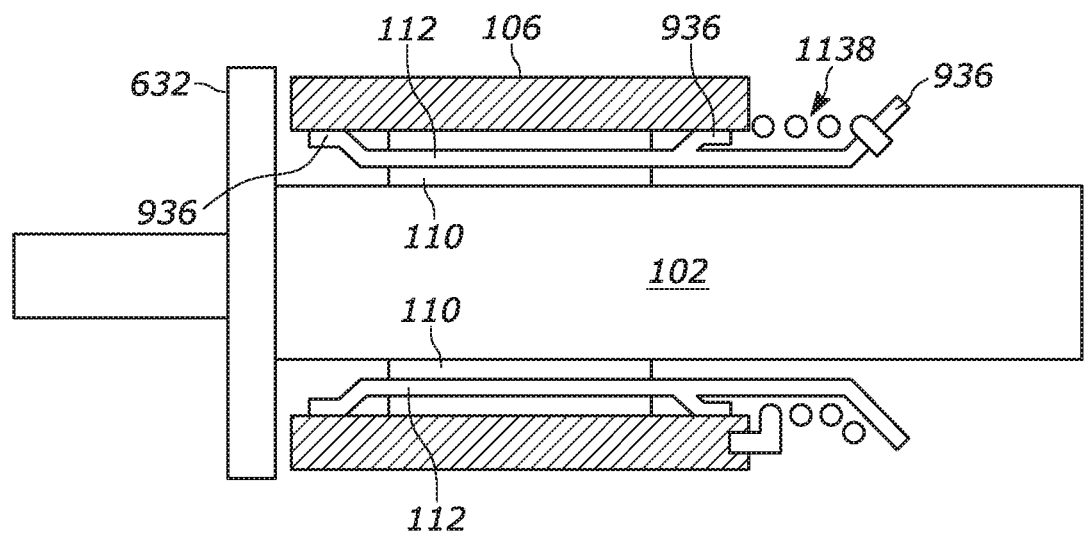
FIG. 12B is a schematic partial side view of the component of FIG. 12A in an example use configuration in the roller screw system of FIG. 1.
Figure 13A:
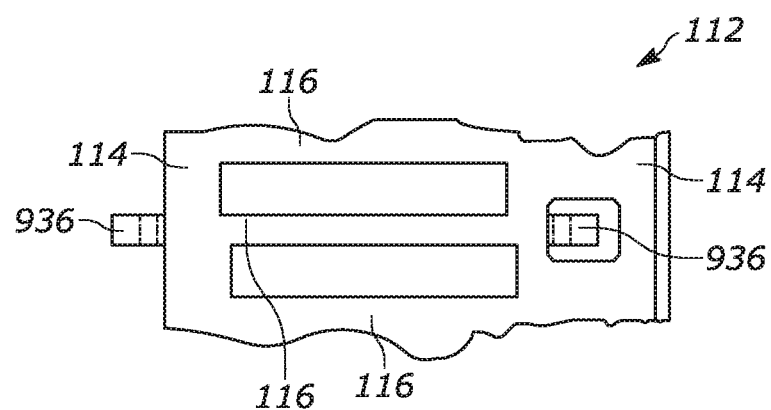
FIG. 13A is a partial side view of a component of the roller screw system of FIG. 1.
Figure 13B:
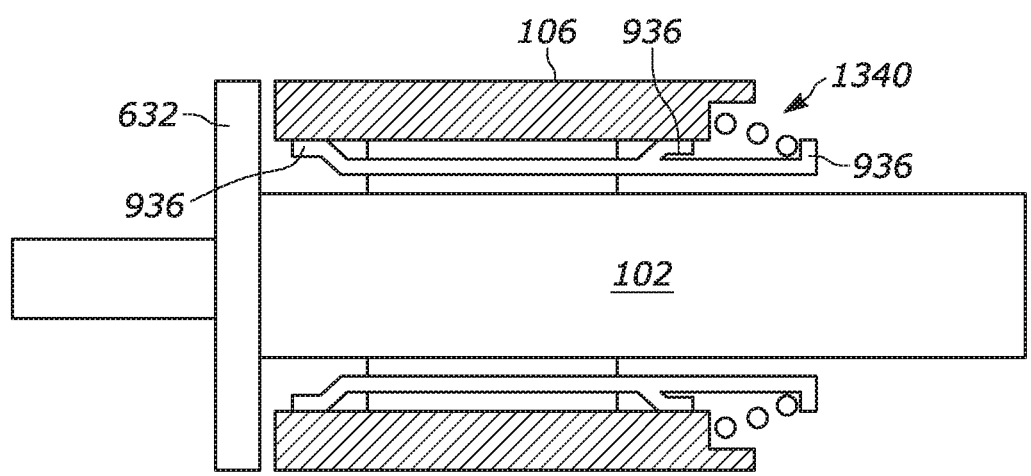
FIG. 13B is a schematic partial side view of the component of FIG. 13A in an example use configuration in the roller screw system of FIG. 1.

Additionally, and as depicted schematically in FIG. 8, the cage 112 may be configured to urge the spindle 102 toward a radially centered position within the nut 106. For example, at least one bar 116 may be contoured to have different radial distances from the spindle 102 at differing longitudinal positions along the bar 116. As a result, the cage 112 may act to "space" or "push" upon at least one of the spindle 102 and the nut 106 to counteract gravity, in order to urge the spindle 102 and the nut 106 toward a substantially coaxial position. This may assist with avoiding undesirable wear and unbalancing issues within the roller screw system 100, or for any other reason.

The arrangement of the roller screw system 100 shown in FIG. 8 uses a contoured or bent configuration of at least one bar 116 of the cage 112 in order to provide the spacing and centering functions just described. However, FIGS. 9A-13B schematically depict a number of different potential arrangements which could help with such centering, urging, and/or spacing functions and affect the radial position of the spindle 102 relative to the nut 106. For example, and as shown in the different example configurations of FIGS. 9A-10B, the cage 110 may include at least one biasing tab 936 for biasing contact with a selected one of the nut 106 and the spindle 102 to urge the spindle 102 toward the radially centered position within the nut 106. One or more tabs 936 could also or instead be provided for selective interaction with the flange 632 of the spindle 102, as shown in these Figures, and thereby act as a "cushioned stop" for nut 106 return toward the spindle 102 during a duty cycle. This would help prevent jarring and forceful contacts between components of the roller screw system 100 during use.

Turning now to FIGS. 11A-13B, the roller screw system 100 could include a selected one of a torsion spring (shown schematically as 1138 in FIGS. 11A-12B) and a compression spring (shown schematically as 1340 in FIGS. 13A-13B) interposed mechanically between the cage and the nut 106. When present, the selected torsion and/or compression spring 1138 or 1340 is operative to help maintain a longitudinal position of the cage 112 relative to the nut 106 during a slip phase of operation. The compression and/or torsion spring 1340 or 1138 may also help to allow the cage 112 to move longitudinally relative to the nut 106 when the at least one roller 110 rotates during a motion transmission phase of operation. Any desired flanges, lips, tabs, apertures, clips, or any other structures could be provided as desired to assist with holding the torsion and/or compression springs 1138 or 1340 in position with respect to other components of the roller screw system 100. Stated differently, the springs may help maintain the cage 112 position relative to the nut 106 during (allowable) slip in the system, and then allow the cage 112 to rotate when the rollers 110 rotate under axial load.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:
1. A roller screw system, comprising:
a spindle including a helically threaded portion and defining a longitudinal axis about which the spindle rotates;
a nut at least partially radially surrounding the helically threaded portion of the spindle, the nut including a helical thread on an interior lumen wall thereof, the nut being configured for longitudinal motion selectively in a first direction and in a second direction, opposite the first direction, with respect to the spindle;
at least one non-helically grooved roller, interposed radially between the spindle and the nut; and
a cage maintaining the at least one roller in position radially between the spindle and the nut, the cage supporting the at least one roller for rotational motion about a longitudinal axis of the at least one roller, the at least one roller maintaining a substantially constant longitudinal position with respect to the cage during operation of the roller screw system, the cage being configured to urge the spindle toward a radially centered position within the nut; wherein
the nut is moved in the first and second directions in a duty cycle responsive to transmission of rotational motion from the spindle to the at least one roller, and transformation of rotational motion of the at least one roller to longitudinal motion of the nut; and a home position of the nut with respect to the spindle and a home position of the cage with respect to the nut both move longitudinally after a predetermined number of duty cycles.

2. The roller screw system of claim 1, wherein the cage includes longitudinally spaced first and second rings and a plurality of longitudinally extending bars, the cage being configured to maintain the at least one roller longitudinally between the first and second rings.

3. The roller screw system of claim 2, wherein at least one bar is contoured to have different radial distances from the spindle at differing longitudinal positions along the bar.

4. The roller screw system of claim 1, wherein the cage includes at least one biasing tab for biasing contact with a selected one of the nut and the spindle to urge the spindle toward the radially centered position within the nut.

5. The roller screw system of claim 1, including a selected one of a torsion spring and a compression spring interposed mechanically between the cage and the nut, the selected spring being operative to maintain a longitudinal position of the cage relative to the nut during a slip phase of operation and to allow the cage to move longitudinally relative to the nut when the at least one roller rotates during a motion transmission phase of operation.

6. The roller screw system of claim 1, including a plurality of rollers, at least two of the plurality of rollers being maintained at different longitudinal positions with respect to the cage.

7. The roller screw system of claim 1, including ten rollers.

8. The roller screw system of claim 1, wherein the home position of the nut with respect to the spindle moves longitudinally in the first direction after the predetermined number of duty cycles.

9. The roller screw system of claim 1, wherein the home position of the cage with respect to the nut moves longitudinally in the second direction after the predetermined number of duty cycles.

10. The roller screw system of claim 1, wherein the at least one roller has a thread angle in the range of 15° to 45°.

11. An electromechanical brake apparatus, comprising:
a housing defining a mechanism cavity;
the roller screw of claim 1 located at least partially within the mechanism cavity;
a brake pad, operatively connected to the nut for longitudinal driving thereby; and
a motor, operatively connected to the spindle to provide rotational motion thereto.

12. An electromechanical brake apparatus, comprising:
a housing defining a mechanism cavity;
a roller screw located at least partially within the mechanism cavity, the roller screw including
a spindle including a helically threaded portion and defining a longitudinal axis about which the spindle rotates,
a nut at least partially radially surrounding the helically threaded portion of the spindle, the nut including a helical thread on an interior lumen wall thereof, the nut being configured for longitudinal motion selectively in a first direction and in a second direction, opposite the first direction, with respect to the spindle,
at least one non-helically grooved roller, interposed radially between the spindle and the nut, and
a cage maintaining the at least one roller in position radially between the spindle and the nut, the cage supporting the at least one roller for rotational motion about a longitudinal axis of the at least one roller, the at least one roller maintaining a substantially constant longitudinal position with respect to the cage during operation of the roller screw system, the cage being configured to urge the spindle toward a radially centered position within the nut; and
a brake pad, operatively connected to the nut for longitudinal driving thereby, the nut being moved, and responsively moving the brake pad, in the first and second directions in a duty cycle responsive to transmission of rotational motion from the spindle to the at least one roller, and transformation of rotational motion of the at least one roller to longitudinal motion of the nut; and
a motor, operatively connected to the spindle to provide rotational motion thereto.

13. The electromechanical brake apparatus of claim 12, wherein the cage includes longitudinally spaced first and second rings and a plurality of longitudinally extending bars, the cage being configured to maintain the at least one roller longitudinally between the first and second rings.

14. The electromechanical brake apparatus of claim 12, including a plurality of rollers, at least two of the plurality of rollers being maintained at different longitudinal positions with respect to the cage.

15. The electromechanical brake apparatus of claim 12, wherein a home position of the nut with respect to the spindle and a home position of the cage with respect to the nut both move longitudinally after a predetermined number of duty cycles, and the home position of the nut with respect to the spindle moves longitudinally in the first direction after the predetermined number of duty cycles.

16. The electromechanical brake apparatus of claim 12, wherein a home position of the nut with respect to the spindle and a home position of the cage with respect to the nut both move longitudinally after a predetermined number of duty cycles, and the home position of the cage with respect to the nut moves longitudinally in the second direction after the predetermined number of duty cycles.

17. The electromechanical brake apparatus of claim 12, wherein a longitudinal position of the cage is maintained relative to the nut during a slip phase of operation and the cage is allowed to move longitudinally relative to the nut when the at least one roller rotates during a motion transmission phase of operation.

* * * * *